United States Patent
Rüffer et al.

(10) Patent No.: US 8,926,293 B2
(45) Date of Patent: *Jan. 6, 2015

(54) MOTOR-PUMP ASSEMBLY

(75) Inventors: Manfred Rüffer, Sulzbach (DE); Jens Bacher, Frankfurt am Main (DE); Heinrich Kreh, Florstadt (DE); Lazar Milisic, Kelkhelm (DE); Karlheinz Seitz, Lorsch (DE); Harald König, Ober-Mörlen (DE); Michael Kollers, Eschborn (DE); Jose Gonzalez, Bad Oeynhausen (DE); Michael Jürging, Kelkheim (DE); Marcel Niepenberg, Groβ-Gerau (DE); Stephan Krebs, Eschborn (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 421 days.

This patent is subject to a terminal disclaimer.

(21) Appl. No.: 13/139,396

(22) PCT Filed: Dec. 15, 2009

(86) PCT No.: PCT/EP2009/067202
§ 371 (c)(1),
(2), (4) Date: Jul. 28, 2011

(87) PCT Pub. No.: WO2010/069963
PCT Pub. Date: Jun. 24, 2010

(65) Prior Publication Data
US 2011/0271670 A1 Nov. 10, 2011

(30) Foreign Application Priority Data

Dec. 19, 2008 (DE) .......................... 10 2008 064 151
Dec. 10, 2009 (DE) .......................... 10 2009 054 502

(51) Int. Cl.
*F04B 25/00* (2006.01)
(Continued)

(52) U.S. Cl.
CPC ................. *F04B 39/16* (2013.01); *B60T 17/02* (2013.01); *F04B 9/045* (2013.01); *F04B 39/0061* (2013.01); *F04B 45/043* (2013.01); *F04B 45/047* (2013.01)
USPC ......... 417/255; 417/312; 417/313; 417/413.1

(58) Field of Classification Search
CPC .... F04B 27/005; F04B 39/16; F04B 39/0061; F04B 45/047; F04B 53/20; F04B 53/144
USPC ................. 417/413.1; 92/113, 114, 187, 191; 74/572.2
See application file for complete search history.

(56) References Cited

U.S. PATENT DOCUMENTS 3,744,342 A * 7/1973 Kinoshita ........................ 74/604
3,877,842 A * 4/1975 Greene et al. .................. 417/312
(Continued)

FOREIGN PATENT DOCUMENTS

DE 102007005223 A1 9/2007
DE 102007020538 A1 10/2008
WO WO 2009/034044 A1 3/2009

*Primary Examiner* — Charles Freay
(74) *Attorney, Agent, or Firm* — Brinks Gilson & Lione

(57) ABSTRACT

Disclosed is a motor-pump assembly (1) for a brake actuating device of a motor vehicle brake system with a pneumatic brake booster. An electric motor (3) drives a double diaphragm pump (2) with two working diaphragms (4) which are located opposite one another. Air expelled from the working spaces (7) is directed into an interior space (22) surrounding a crank drive (8) of the pump housing (5). An air outlet unit (13) permits low-noise expulsion of the air from the interior space 22 by deflecting the air.
In order to make available a low-noise, cost-reduced motor-pump assembly the eccentrics (9) each have an unbalance weight (25) integrally molded onto the eccentric (9).

8 Claims, 5 Drawing Sheets

(51) Int. Cl.
  *F04B 17/03* (2006.01)
  *F04B 39/16* (2006.01)
  *B60T 17/02* (2006.01)
  *F04B 9/04* (2006.01)
  *F04B 39/00* (2006.01)
  *F04B 45/04* (2006.01)
  *F04B 45/047* (2006.01)

(56) References Cited

U.S. PATENT DOCUMENTS

| 4,730,999 | A | | 3/1988 | Tsukuda et al. |
| 5,634,391 | A | * | 6/1997 | Eady .................................. 92/97 |
| 8,714,941 | B2 | * | 5/2014 | Ruffer et al. .................. 417/255 |
| 2003/0103843 | A1 | | 6/2003 | Seo |

* cited by examiner

MOTOR-PUMP ASSEMBLY

CROSS REFERENCE TO RELATED APPLICATIONS

This application claims priority to German Patent Applications No. 102008064151.0, filed Dec. 19, 2008, and 102009054502.6, filed Dec. 10, 2009, as well as International Patent Application No. PCT/EP2009/067202, filed Dec. 15, 2009.

TECHNICAL FIELD OF THE INVENTION

The invention relates to a motor-pump assembly for a motor vehicle brake system.

BACKGROUND OF THE INVENTION

In order to make available a vacuum for a pneumatic brake booster whose interior is divided into at least one vacuum chamber and one working chamber, vacuum pumps are used which suck in residual air from the vacuum chamber and discharge it into the atmosphere. Vane-type pumps or pivoting vane-type pumps are generally used for this purpose in the automobile industry. Said pumps have, due to the principles involved, a large amount of friction and have to be lubricated in order to achieve an acceptable service life. Vacuum pumps which are driven by the internal combustion engine of the motor vehicle and have vanes are therefore connected to the oil circuit of the internal combustion engine. Nevertheless, an appreciable portion of the power which is output by the internal combustion engine has to be used to drive such a pump. And this is the case even when the vacuum in the chamber which is to be evacuated is already fully formed. For this reason it is appropriate to operate the vacuum pump with electrical energy and to switch it on only when the absolute pressure in the vacuum chamber rises above a predetermined value.

Furthermore, in vehicles with an electric drive or hybrid drive, the vacuum pump cannot be driven, or at certain times cannot be driven, by the internal combustion engine. For this reason, electrically driven vacuum pumps are used in these vehicles.

Equipping such an electrically driven pump with a lubricant circuit or connecting such a pump to such a circuit would mean an unacceptably high expenditure. As a result, only dry-running vacuum pumps are possible for use in motor vehicles with brake systems with an electrically driven vacuum pump. In vane-type pumps, the self-lubricating material graphite is used for this, the vanes being manufactured from graphite with the necessary precision at high cost. For this reason, efforts have been made to use a diaphragm pump for electrically supplying a braking vacuum.

A motor-pump assembly of the generic type is known, for example, from DE 10 2007 005 223 A1.

SUMMARY OF THE INVENTION

Efforts are always being made to reduce the manufacturing costs and the expenditure on mounting. For this reason, the object of the present invention is to make available a low-noise, cost-reduced motor-pump assembly which requires reduced expenditure on mounting compared to the known assembly of the generic type. In addition, the number of components is to be reduced.

The object is achieved according to the invention in that the eccentrics with the unbalance weights are provided as sintered components. This allows the mounting of the air inlet unit to be significantly simplified and the number of components to be reduced.

Further features, advantages and application possibilities of the invention emerge from the following description of an exemplary embodiment and on the basis of the drawing.

DETAILED DESCRIPTION OF THE DRAWINGS

Figure 1:
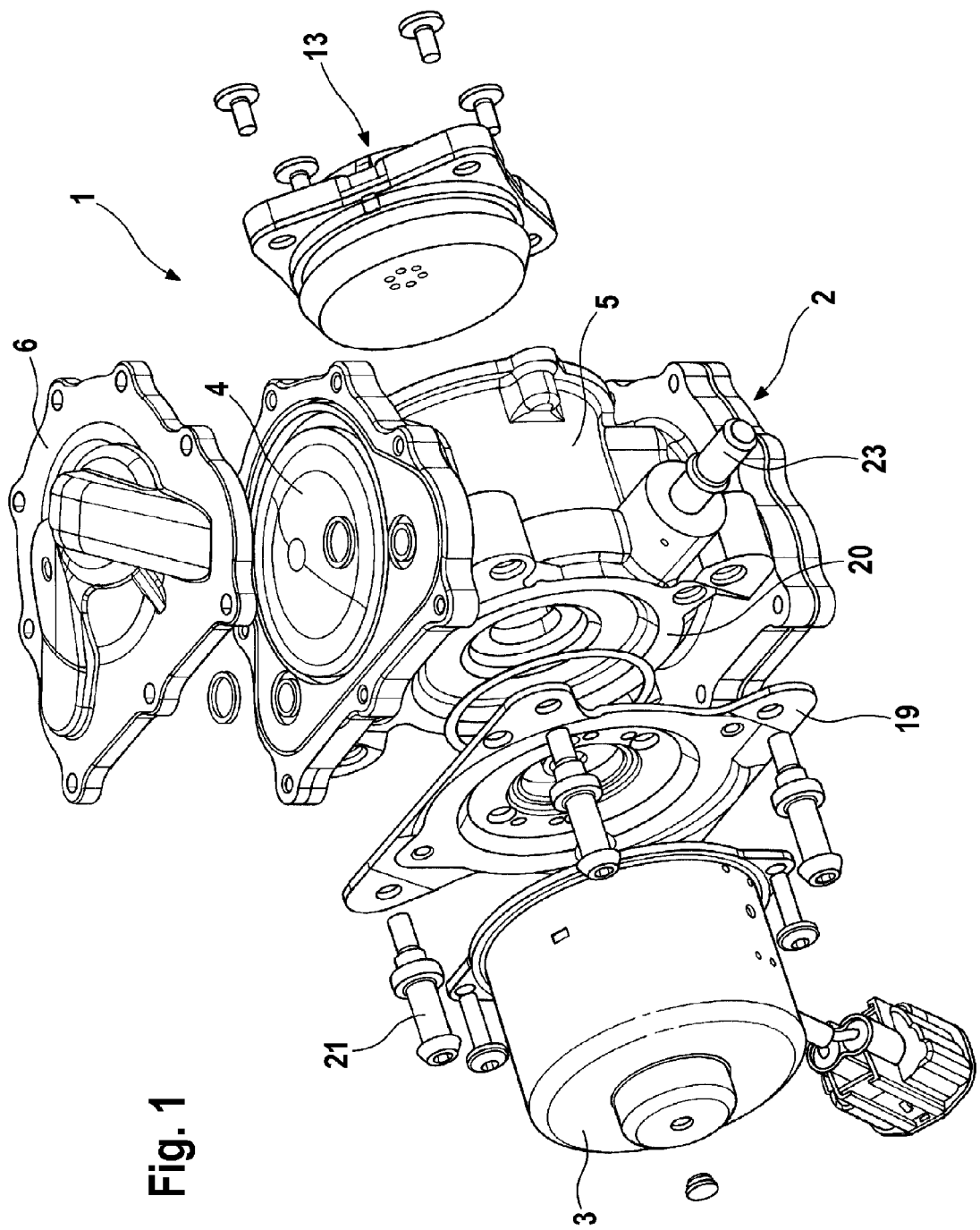
FIG. 1 shows a motor-pump assembly according to the invention in a spatial illustration.

FIG. 1 shows a motor-pump assembly 1 according to the invention in an exploded illustration, which motor-pump assembly 1 comprises a pump 2 with a pump housing 5 and an electric motor 3 which drives the pump 2, wherein the motor 3 can be embodied, for example, as a direct current motor.

Figure 2:
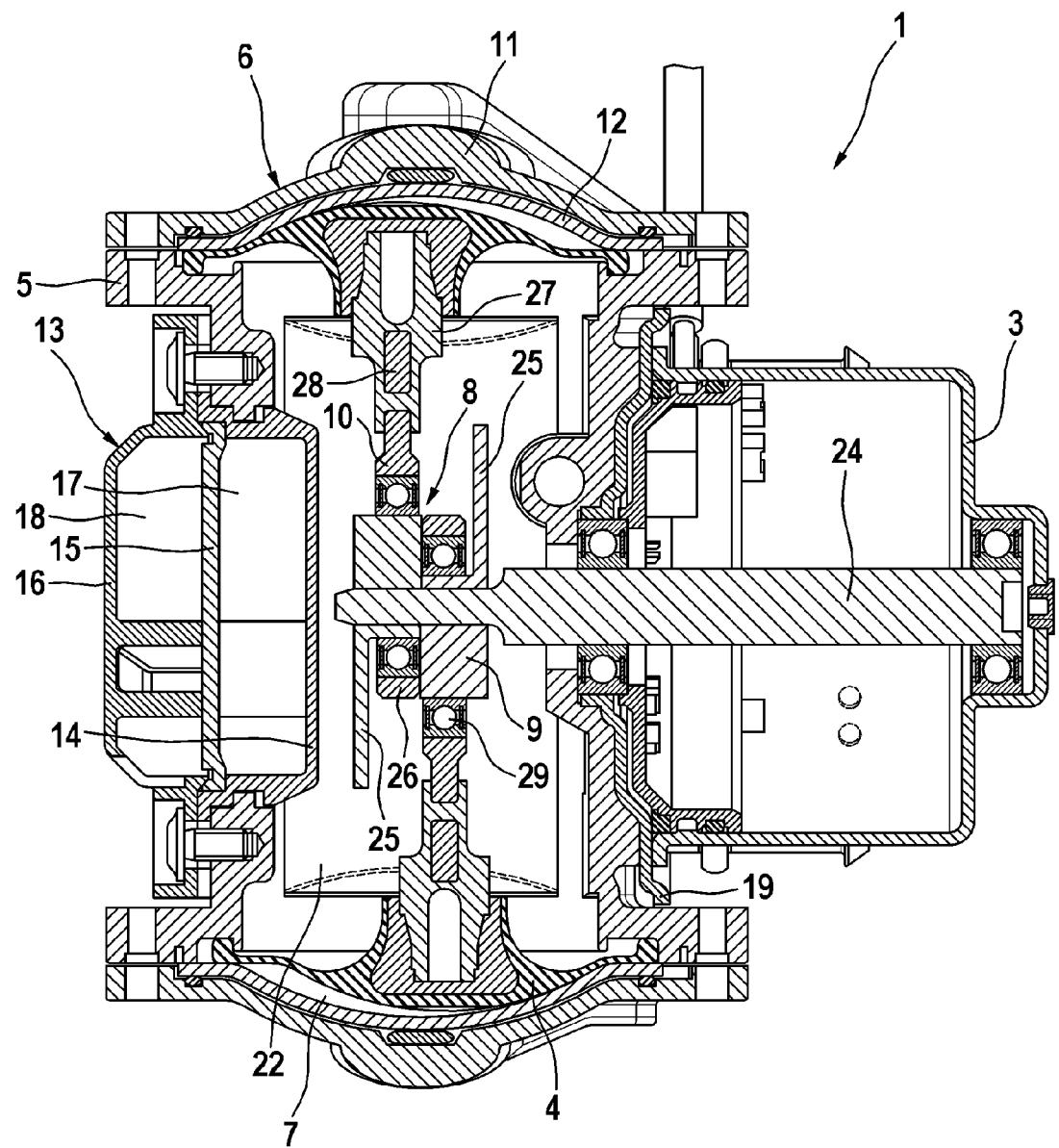
FIG. 2 shows the motor-pump assembly according to FIG. 1 in a longitudinal section.

The pump 2 is, as is apparent in particular from the sectional illustration according to FIG. 2, provided as a double diaphragm pump with two working diaphragms 4 which are located opposite one another and which are each clamped in between the pump housing 5 and a working space cover 6, and as a result bound a working space 7. The working diaphragms 4 can be moved in opposite directions by means of a crank drive 8, which comprises an eccentric 9 and a connecting rod 10 per working diaphragm 4. The working space cover 6 has an upper cover 11 and a lower cover 12 which are welded, riveted or screwed to one another in an airtight fashion. In order to reduce costs, the upper cover 11 is provided made of plastic, and the lower cover 12 is embodied as a punched part or sintered part. Cost-effective manufacture by means of aluminum die casting is also possible.

Inlet valves and outlet valves (not shown) are provided in the working space covers 6. The discharged air is conducted from the outlet valve via an outlet duct in the working space cover 6 to an outlet duct in the pump housing 5, which ducts are connected in an airtight fashion by means of a seal-forming element. The two outlet ducts in the pump housing 5 open into an interior space 22 in the pump housing 5, referred to as the crank space, which surrounds the crank drive 8.

An air outlet unit 13 which is provided in the pump housing 5 and is composed of a filter housing 14, an intermediate floor 15 and an air outlet cover 16 permits low-noise expulsion of the air from the interior space 22, which therefore serves as a sound damping space. Furthermore, the air outlet unit 13 comprises a nonreturn valve (not illustrated) with a single-component or multi-component valve body which prevents air which has already been discharged from flowing back and prevents liquid or gaseous substances from entering the interior space 22.

In addition, the air-borne sound when the air exits the interior space 22 is reduced by virtue of the fact that when the air flows through the air outlet unit 13 it is deflected repeatedly and in the process flows through two filter elements 17, 18 before it exits the air outlet unit 13.

The pump housing 5 is provided from plastic, permitting cost-effective manufacture. As is apparent from FIGS. 1 and 2, a motor shield 19 is arranged between the motor 3 and the pump housing 5, is attached to a motor flange side 20 of the pump housing 5 and blocks EMC radiation which is output by the motor 3.

The motor 3 and the motor shield 19 are attached to the pump housing 5 by means of screw elements 21 which are screwed directly into the pump housing 5.

In addition, a connection 23 which is shown in FIG. 1 and via which, for example, a connected brake booster is evacuated is provided on the pump housing 5.

From FIG. 2 it is also apparent that a motor shaft 24 serves simultaneously as an eccentric shaft which bears the crank drive 8 with the eccentrics 9 and the connecting rods 10. However, a separate embodiment of the motor shaft and eccentric shaft is also possible.

Figure 3:
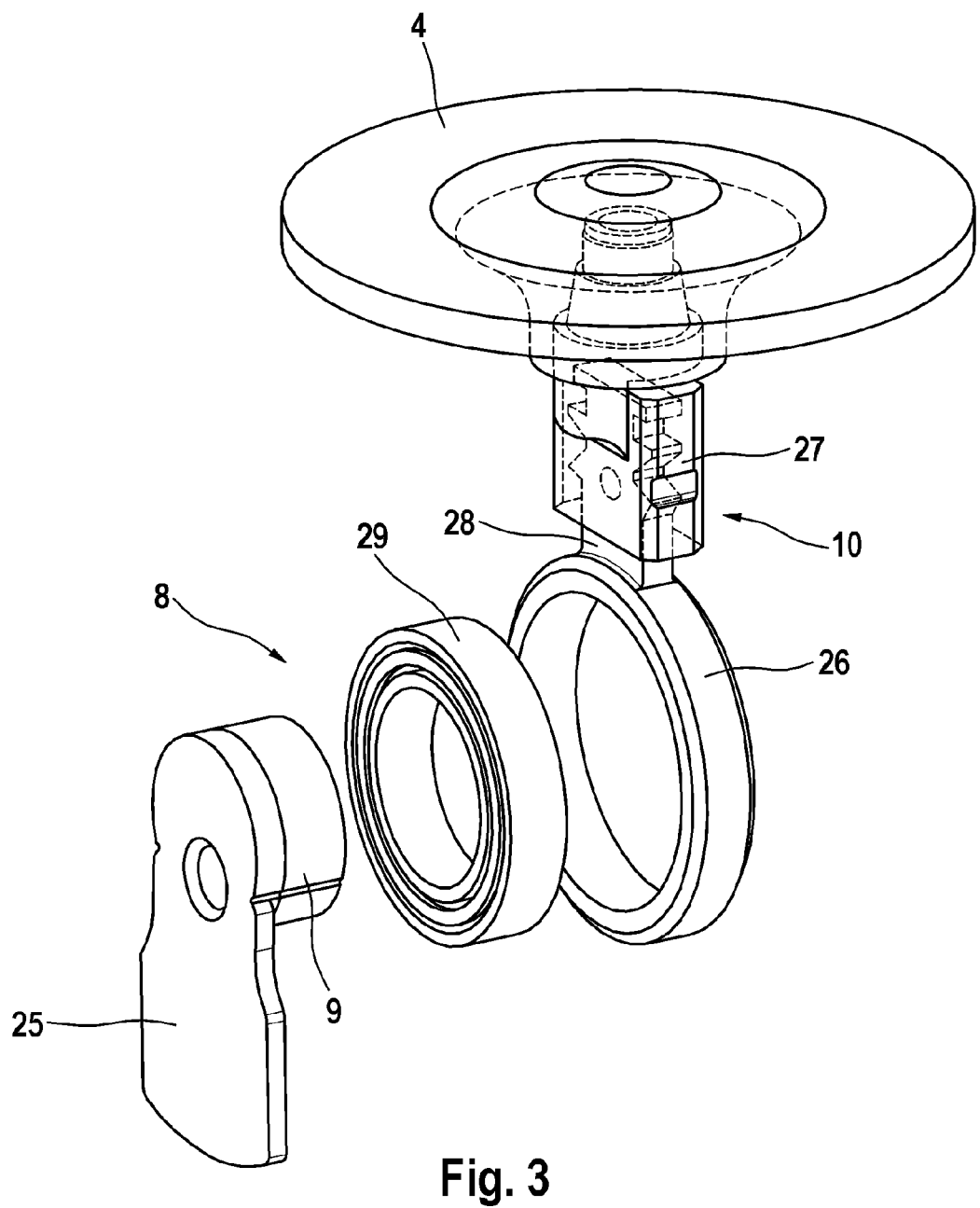
FIG. 3 shows a working diaphragm in the motor-pump assembly according to FIGS. 1 and 2 with a crank drive.
Figure 4:
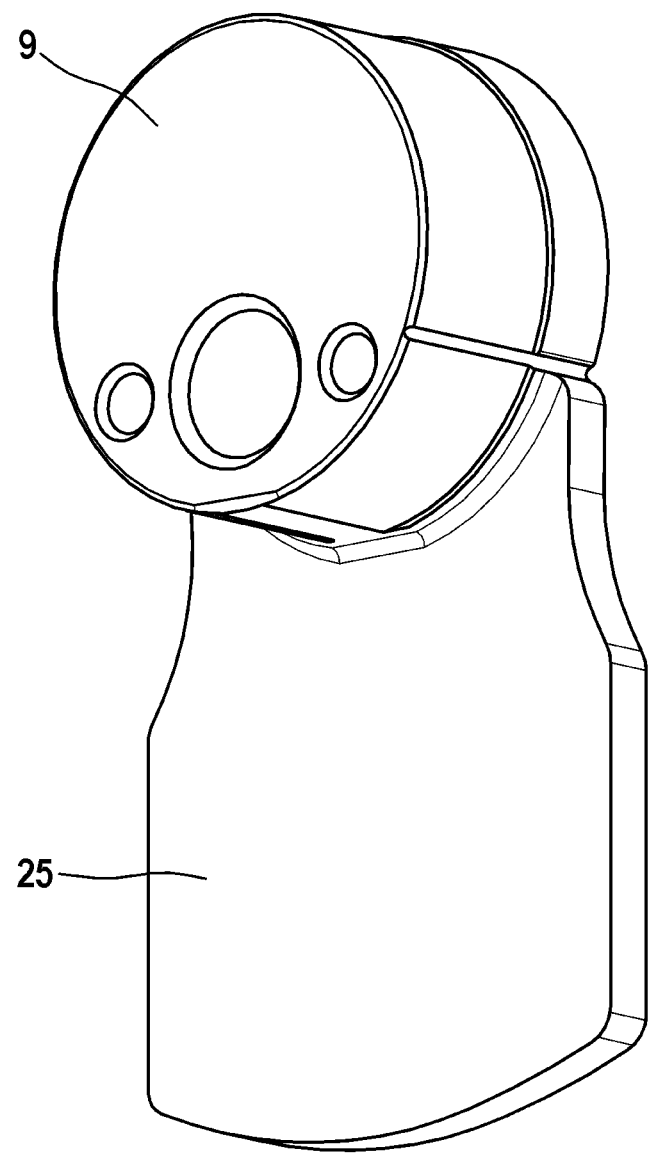
FIG. 4 shows an eccentric of the crank drive according to FIG. 3 with a molded-on unbalance weight.
Figure 5:
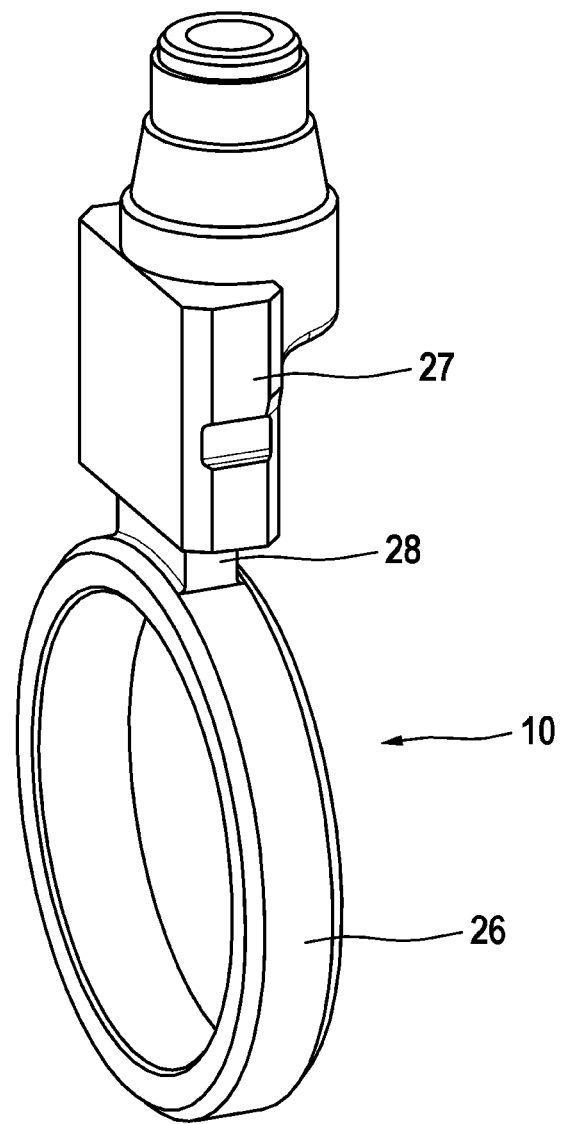
FIG. 5 shows a connecting rod of the crank drive according to FIG. 3.

FIG. 3 shows in a spatially exploded illustration a working diaphragm 4 with a crank drive 8 comprising eccentric 9 and connecting rod 10, wherein enlarged views of the eccentric 9 and of the connecting rod 10 can be found in FIGS. 4 and 5.

As is clearly apparent from FIG. 4, the eccentric 9 has, for the purpose of optimizing oscillation, an unbalance weight 25 which is integrally molded on, wherein the eccentric 9 and the unbalance weight 25 are manufactured as sintered components. This configuration of the eccentric 9 brings about, on the one hand, cost-effective manufacture and simplified mounting since the separate mounting of the unbalance weight 25 on the eccentric 9 by means of screwing, welding, etc. can be dispensed with, and, on the other hand, it brings about a further reduction in the number of components.

In order to optimize costs further, a connecting eyelet 26 of the connecting rod 10 is manufactured as a sintered component, and a connecting rod shank 27 is provided made of plastic. The attachment of the connecting rod shank 27 to the connecting eyelet 26 is carried out by encapsulation by injection molding of an extension 28 which is molded onto the connecting eyelet 26.

The working diaphragm 4 can easily be attached to the connecting rod shank 27 by friction welding. A ball bearing 29 is pressed into the connecting eyelet 26.

An embodiment of the invention which is not shown provides that the connecting rod 10 is manufactured in one piece as a sintered component.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A motor-pump assembly for providing pressure for a brake actuating device of a motor vehicle brake system having a pneumatic brake booster, comprising
   a double diaphragm pump with a first and a second working diaphragm opposite one another; the first working diaphragm being clamped in between a pump housing and a first working space cover and as a result bounding a first working space, and the second working diaphragm being clamped in between the pump housing and a second working space cover and as a result bounding a second working space;
   an electric motor driving a crank drive having an eccentric and connecting rods acting on the first and second working diaphragm, the eccentrics each having an unbalance weight integrally formed on the eccentric, wherein the eccentrics with the unbalance weights are sintered components;
   wherein each of the connecting rods comprises:
      a sintered connecting eyelet coupled to the corresponding eccentric, and a plastic connecting rod shank, coupled to the corresponding connecting eyelet and one of the first working diaphragm and the second working diaphragm; and
      an extension of each connecting eyelet that extends radially from the corresponding connecting eyelet, wherein the connecting rod shank is injection molded to encapsulate the corresponding extension;
   a first inlet duct with a first inlet valve assigned to the first working space;
   a second inlet duct with a second inlet valve assigned to the second working space;
   a first outlet duct with a first outlet valve assigned to the first working space,
   a second outlet duct with a second outlet valve assigned to the second working space,
   the first and second outlet ducts guiding air expelled from the first and second working spaces into an interior space of the pump housing surrounding the crank drive; and
   an air outlet unit for releasing the expelled air from the interior space by deflecting the air.

2. The motor-pump assembly as claimed in claim 1, wherein the connecting rods are sintered components.

3. The motor-pump assembly as claimed in claim 1, wherein the working diaphragms are attached to the connecting rods by friction welding.

4. A motor-pump assembly for providing pressure for a brake actuating device of a motor vehicle brake system having a pneumatic brake booster, comprising
   a double diaphragm pump with a first and a second working diaphragm opposite one another; the first working diaphragm being clamped in between a pump housing and a first working space cover and as a result bounding a first working space, and the second working diaphragm being clamped in between the pump housing and a second working space cover and as a result bounding a second working space;
   an electric motor driving a crank drive having an eccentric and connecting rods acting on the first and second working diaphragm, the eccentrics each having an unbalance weight integrally formed on the eccentric;
   wherein each of the connecting rods comprises:
      a connecting eyelet coupled to the corresponding eccentric, and a connecting rod shank, coupled to the corresponding connecting eyelet and one of the first working diaphragm and the second working diaphragm; and
      an extension of each connecting eyelet that extends from the corresponding connecting eyelet, wherein the connecting rod shank encapsulates the corresponding extension by injection molding;
   a first inlet duct with a first inlet valve assigned to the first working space;
   a second inlet duct with a second inlet valve assigned to the second working space;

a first outlet duct with a first outlet valve assigned to the first working space, a second outlet duct with a second outlet valve assigned to the second working space, the first and second outlet ducts guiding air expelled from the first and second working spaces into an interior space of the pump housing surrounding the crank drive; and an air outlet unit for releasing the expelled air from the interior space by deflecting the air.

5. The motor-pump assembly of claim 4, wherein the extension extends radially from the connecting eyelet.

6. The motor-pump assembly of claim 4, wherein the eccentrics with unbalance weights are sintered components.

7. The motor-pump assembly of claim 4, wherein the connecting eyelets are sintered components, and the rod shanks are plastic.

8. The motor-pump assembly of claim 4, wherein the working diaphragms are attached to the connecting rods by friction welding.

* * * * *